W. C. KLIBER.
NUT LOCK.
APPLICATION FILED JUNE 23, 1913.

1,099,752.

Patented June 9, 1914.

UNITED STATES PATENT OFFICE.

WILLIAM C. KLIBER, OF FEDERALSBURG, MARYLAND, ASSIGNOR OF ONE-HALF TO ORLANDO PATTON AND THREE-EIGHTHS TO HARRY SPICER, BOTH OF FEDERALSBURG, MARYLAND.

NUT-LOCK.

1,099,752.      Specification of Letters Patent.      Patented June 9, 1914.

Application filed June 23, 1913. Serial No. 775,321.

*To all whom it may concern:*

Be it known that I, WILLIAM C. KLIBER, a citizen of the United States, residing at Federalsburg, in the county of Caroline and State of Maryland, have invented certain new and useful Improvements in Nut-Locks, of which the following is a specification.

The present invention relates to that type of devices for preventing accidental displacement of nuts from bolts wherein the nut carries a locking member adapted during the application of the nut to the bolt to interlock said nut with a washer that is held stationary in respect to the bolt by suitable means.

The invention resides particularly in the mounting of a spring locking member on the nut, which member is adapted to lock said nut in the manner above suggested but permits of removal of the nut by the exercise of sufficient power to overcome the locking action of said member. The locking member, however, may be again used by the formation anew of a locking element which is carried thereby.

Figure 1:
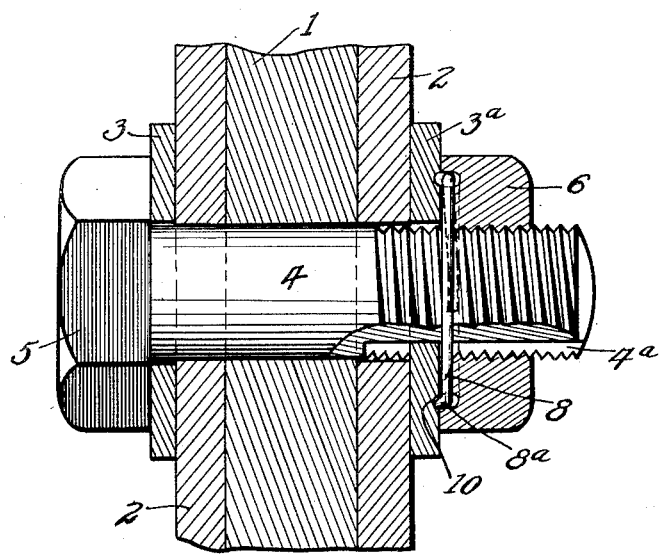
Figure 2:
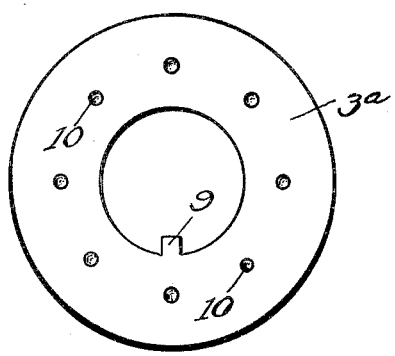
Figure 3:
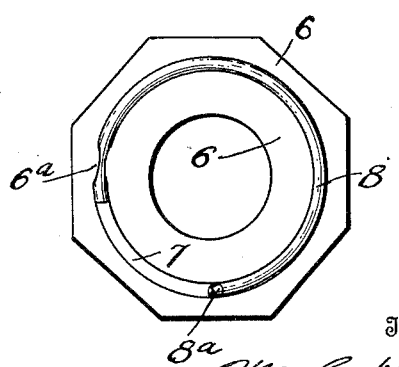

In the drawings:—Figure 1 is a sectional view showing nut locking means in accordance with the invention as applied to a rail joint, the rails and fish plates being partially broken away; Fig. 2 is a face view of the locking washer; and Fig. 3 is a face view of the inner side of the nut showing more clearly the arrangement and manner of attachment of the spring locking member in respect thereto.

The rail in the drawings is designated at 1 and has the usual fish plates 2 at opposite sides thereof.

It is to be understood that the invention is merely shown applied to a rail joint for the purposes of illustration since the nut locking means hereinafter set forth may be used to equal advantage in connection with bolts and nuts of machines, or the like.

At the outer sides of the fish plates 2 are the washers 3 and $3^a$, the bolt 4 passing through the several parts 1, 2, 3 and $3^a$ and having its head 5 abutting with the washer 3 while the nut 6 when screwed in the threaded portion of the bolt is adapted to abut with the outer surface of the washer $3^a$.

To afford a convenient method of preventing rotation of the washer $3^a$ in respect to the bolt 4 said bolt 4 is formed with a longitudinal groove $4^a$ and a projection or lug 9 extending into the opening of the washer $3^a$ is adapted to engage in the groove $4^a$, this being a common expedient in this art to afford a non-rotative connection between a locking washer and bolt. The nut 6 is formed on its under side with a circular groove or depression 7 in which is mounted a spring locking member 8, preferably of stout spring wire of suitable gage, said member 8 having one terminal thereof bent outwardly from the adjacent face of the nut to form a locking element $8^a$. The member 8 is peculiarly secured to the nut 6 by punching or pressing portions of the metal of the nut at opposite sides of the groove 7 in such a manner as to overlap the end portion of the member 8 opposite that having the terminal locking element $8^a$, the point of attachment of the part 8 to the nut 6 being shown at $6^a$. On its outer surface the locking washer $3^a$ is formed with depressions or recesses 10, with any one of which the locking element $8^a$ of the member 8 is adapted to engage as the nut 6 is screwed home against the washer $3^a$ in applying said nut to the bolt 4. The depressions or recesses 10 being very slight in depth it is possible for the element $8^a$ to ride into and out of said depressions as the nut is screwed against the washer $3^a$, but owing to the inclination of the element $8^a$ a reverse movement of the nut will be prevented in effective manner, under normal conditions. In other words, with the parts arranged as in Fig. 1, the member 8 with its locking element $8^a$ constitutes a firm lock means to prevent accidental unscrewing movement of the nut 6 due to vibration, jar, or other similar cause.

Since the member 8 is made of spring wire or material, if a tool is applied to the nut 6 and sufficient force exerted to cause unscrewing movement of the lock the element $8^a$ of the member 8 will be sheared off and in this way only may the nut 6 be released. While this operation will not be one necessary to be performed with any frequency, nevertheless occasion sometimes arises for the removal of a lock nut and hence the desirability of the formation of parts as described. Once a nut has been removed in the above manner, owing to the fact that the connection at 6ª, intermediate the nut and member 8, will permit a slight rotative movement of the member 8 the body portion of the latter may be raised a slight distance out of the groove 7, a tool may be readily applied to the sheared off terminal of the member 8 and a new locking element 8ª bent therefrom. It is possible, owing to the size of the member 8 to form a new locking element 8ª a number of times, after a corresponding number of removals of the nut from the bolt.

Having thus described the invention, what I claim as new is:—

Nut locking means comprising in combination, a washer having means for non-rotatably securing the same to a bolt, a nut adapted to be screwed on a bolt at the outer side of said washer and formed on its under side with a groove, a locking member comprising a piece of curved wire seated in said groove and having an outwardly bent terminal constituting a locking element arranged to engage the washer, the under side of the nut at the opposite walls of said groove being formed with portions engaging the opposite terminal of said wire so as to form a bearing in which the wire is slightly rotatable to permit movement of the locking end of the same into a position extending outward from the nut, whereby said locking end may be rebent after its locking element has been sheared off by forcible removal of the nut from a bolt.

In testimony whereof I affix my signature in presence of two witnesses.

WILLIAM C. KLIBER.

Witnesses:
RALPH S. BROWN,
DONALD E. JEFFERSON.

---

Copies of this patent may be obtained for five cents each, by addressing the "Commissioner of Patents, Washington, D. C."